April 18, 1939.  A. J. RUBIN  2,155,241

SKIRT LENGTH CUTTING DEVICE

Filed June 9, 1937   2 Sheets-Sheet 1

INVENTOR
Adolph J. Rubin
BY
Clark & Ott
ATTORNEYS

April 18, 1939.　　　　A. J. RUBIN　　　　2,155,241
SKIRT LENGTH CUTTING DEVICE
Filed June 9, 1937　　　2 Sheets-Sheet 2
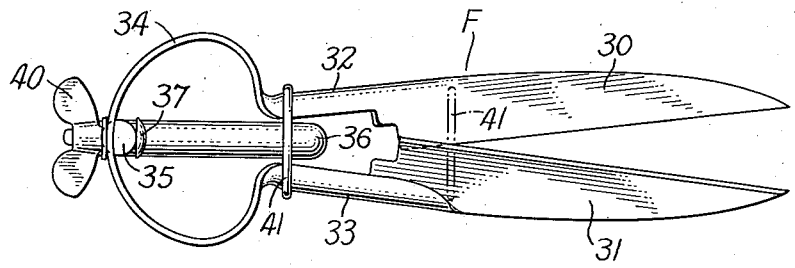
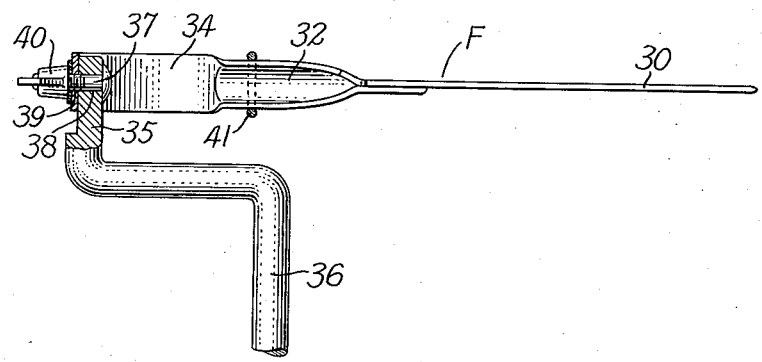
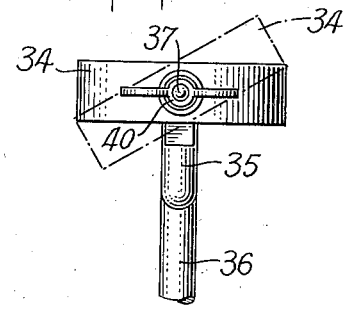
INVENTOR
*Adolph J. Rubin*
BY
*Clark & Ott*
ATTORNEYS Patented Apr. 18, 1939

2,155,241

UNITED STATES PATENT OFFICE 2,155,241

SKIRT LENGTH CUTTING DEVICE

Adolph J. Rubin, New York, N. Y.

Application June 9, 1937, Serial No. 147,185

1 Claim. (Cl. 30—231)

This invention relates to garment cutting devices and refers more particularly to a device for facilitating the accurate cutting of a skirt to a pre-determined length whereby the same will hang evenly.

The invention primarily resides in a skirt length cutting device embodying a shearing implement and means for supporting the same from and in spaced relation to the floor or an equivalent surface upon which is arranged a form or model having the skirt applied thereto.

The invention further comprehends a skirt length cutting device of the indicated character in which the shearing implement supporting means is adjustable vertically so as to vary the distance of the shearing implement to the floor in accordance with the length to which the skirt is to be cut.

As an additional feature the invention includes in a skirt length cutting device, a shearing implement and a support therefor with a connection therebetween to permit of angular adjustment or canting of the shearing implement with reference to the support.

With the above enumerated and other objects in view, reference is now made to the following specification and the accompanying drawings in which there is disclosed by way of example several embodiments of the invention while the claim covers variations and modifications thereof which fall within the scope of the invention.

In the drawings:

Fig. 4 is a top plan view of a further modification thereof.

Fig. 5 is a fragmentary side view thereof with parts broken away and shown in section.

Fig. 6 is a fragmentary rear view of the same.

Figure 1:
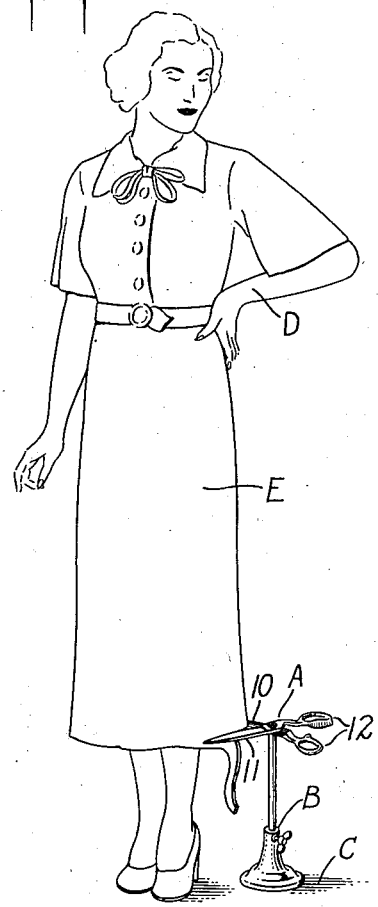
Fig. 1 is a perspective view illustrating the skirt length cutting device in use.
Figure 2:
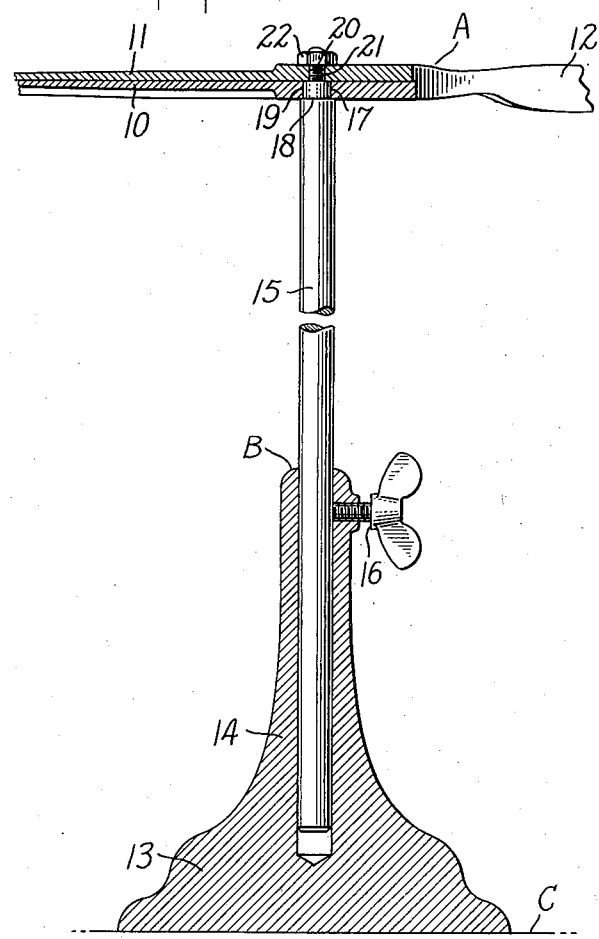
Fig. 2 is a fragmentary enlarged vertical sectional view therethrough.

Referring to the drawings by characters of reference, A designates generally a shearing implement which includes a pair of pivotally connected blades 10 and 11 provided respectively with the usual looped manipulating handles 12. The shearing implement in this form of the invention is carried by a support designated generally by the reference character B which support includes a suitable base 13 adapted to rest on the floor or other supporting surface C and provided with an upstanding tubular portion 14 which telescopically receives a standard 15 in the form of a rod which is vertically adjustable in the base and secured in vertically adjusted position by a set screw 16 which is threaded through the portion 14 and is adapted to be impinged against the standard 15.

The upper end of the standard or rod 15 is provided with a reduced terminal 17 defining a shoulder 18, the terminal 17 being received by an aperture 19 in the blade 10. A further reduced and threaded extremity 20 extends through the aperture 21 in the blade 11 and receives on the protruding upper end a nut 22. It will, therefore, be seen that in addition to providing the support for the shearing implement A, the standard or rod 15 also provides the pivotal connection between the implement blades.

In use the form or model D upon which the skirt is applied stands on the supporting surface C with the device adjacent thereto and the standard is adjusted vertically to dispose the cutting implement A at the distance from the floor corresponding to the length to which the skirt is to be cut thereby acting as a gage for evenly cutting the skirt to the desired length so that it will hang evenly.

Figure 3:
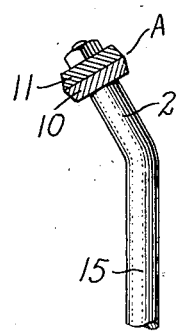
Fig. 3 is a fragmentary sectional view illustrating a modified adaptation of the invention.

In the modified form of the invention illustrated in Fig. 3 of the drawings, the standard or rod 15 has the upper end portion 25 thereof disposed at an angle to the vertical so that the blades 10 and 11 of the shearing implement A are canted to facilitate the cutting operation. In other respects the device is identical with that described in the previous form of the invention.

In Figs. 4, 5 and 6 of the drawings the shearing implement designated generally by the reference character F is of the spring type as distinguished from the pivoted blade type and in this instance the blades 30 and 31 are carried by shank portions 32 and 33 which are in turn attached to a resilient connecting bight 34. The bight 34 is pivotally attached to the offset upper end 35 of the standard 36 by means of a horizontally disposed bolt 37 which extends through aligned apertures 38 and 39 in the offset terminal 35 and bight 34, a wing nut 40 engaging the bolt for locking the shearing implement F with the blades horizontal or canted in accordance with the desires of the operator.

In order to secure the blades in closed relation when not in use, a loop member 41 is slidably arranged on the shank portions 32 and 33 of the blades and is movable from the broken line, active position shown in Fig. 4 to the retracted inactive full line position when the shearing implement is to be used.

What is claimed is:

A skirt length cutting device including a shearing implement comprising a pair of shearing blades, a shank for each shearing blade and a resilient bight connecting said shanks, a supporting means for said shearing implement including a standard, said standard at the upper end thereof and said bight at the mid-portion thereof having aligned apertures therein, means extending through said apertures for connecting the shearing implement to the standard, and means engaging said first named means for locking said implement with the blades selectively disposed in a horizontal position perpendicular to said standard or in a position perpendicular to said standard and at an angle to the horizontal.

ADOLPH J. RUBIN.